US009725180B2

(12) United States Patent
Hubner et al.

(10) Patent No.: US 9,725,180 B2
(45) Date of Patent: Aug. 8, 2017

(54) SHORT TERM, AUTONOMOUS, ELECTRICAL POWER SUPPLY SYSTEM

(71) Applicant: AIRBUS HELICOPTERS DEUTSCHLAND GMBH, Donauworth (DE)

(72) Inventors: Christoph Hubner, Heidenheim (DE); Uwe Renner, Friedberg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 475 days.

(21) Appl. No.: 14/465,870

(22) Filed: Aug. 22, 2014

(65) Prior Publication Data

US 2015/0061292 A1  Mar. 5, 2015

(30) Foreign Application Priority Data

Aug. 30, 2013 (EP) .................................... 13400018

(51) Int. Cl.
*B64D 25/08* (2006.01)
*F01D 15/10* (2006.01)
(Continued)

(52) U.S. Cl.
CPC .............. *B64D 25/08* (2013.01); *B64C 1/143* (2013.01); *B64C 1/1407* (2013.01); *E05F 11/54* (2013.01);
(Continued)

(58) Field of Classification Search
CPC ........ B64D 25/08; E05F 15/603; E05F 11/54; F42B 3/04; F42B 3/006; B64C 1/143;
(Continued)

(56) References Cited

U.S. PATENT DOCUMENTS 2,984,211 A * 5/1961 Schneider .............. B64D 25/04
123/24 R
4,381,084 A * 4/1983 Fohl .................... B60R 22/4628
242/374

(Continued)

FOREIGN PATENT DOCUMENTS

CN  100386246 C  5/2008
CN  102686479 A  9/2012
(Continued)

OTHER PUBLICATIONS

European Search Report for EP 13400018, Completed by the European Patent Office on Feb. 17, 2014, 5 Pages.
(Continued)

*Primary Examiner* — Hoang Nguyen
(74) *Attorney, Agent, or Firm* — Brooks Kushman P.C.

(57) ABSTRACT

A short term, autonomous, electrical power supply system, particularly an emergency short term, autonomous, electrical power supply system. Said system comprises an actuator with an electrical motor (14), an electrical generator (15) for driving said electrical motor (14) of said actuator, a turbine (13) in driving engagement with said electrical generator (15), an generator (7) of combustible, fluidic energy, a fluid line (10) from said generator (7) to said turbine (13), a control unit (5), and an igniter (9) arranged inside said generator (7) and controlled by said control unit (5).

20 Claims, 1 Drawing Sheet

(51) Int. Cl.
| | | |
|---|---|---|
| E05F 11/54 | (2006.01) | |
| F02C 3/20 | (2006.01) | |
| H02K 7/18 | (2006.01) | |
| B64C 1/14 | (2006.01) | |
| F42B 3/00 | (2006.01) | |
| F42B 3/04 | (2006.01) | |
| E05F 15/603 | (2015.01) | |

(52) U.S. Cl.
CPC ............ *E05F 15/603* (2015.01); *F01D 15/10* (2013.01); *F02C 3/20* (2013.01); *F42B 3/006* (2013.01); *F42B 3/04* (2013.01); *H02K 7/1823* (2013.01)

(58) Field of Classification Search
CPC .......... B64C 1/1407; F02C 3/20; F01D 15/10; H02K 7/1823
USPC .................................................. 60/632–638
See application file for complete search history.

(56) References Cited

U.S. PATENT DOCUMENTS

| | | | |
|---|---|---|---|
| 5,184,458 A | | 2/1993 | Lampe et al. |
| 5,251,851 A | * | 10/1993 | Herrmann ............... B64C 1/143 244/129.5 |
| 7,950,606 B2 | | 5/2011 | Atkey et al. |
| 8,844,857 B2 | * | 9/2014 | Shin .................... B60R 22/4633 242/374 |
| 2013/0048781 A1 | | 2/2013 | Berenger et al. |
| 2013/0318873 A1 | * | 12/2013 | Knijnenburg ......... B64C 1/1407 49/31 |

FOREIGN PATENT DOCUMENTS

| | | |
|---|---|---|
| DE | 10212188 | 10/2003 |
| EP | 1418121 | 5/2004 |
| EP | 2305560 A2 | 4/2011 |
| EP | 2305560 A3 | 4/2011 |
| WO | 2004037641 A2 | 5/2004 |
| WO | 2004037641 A3 | 5/2004 |
| WO | 2009115879 A1 | 9/2009 |

OTHER PUBLICATIONS

Chinese First Office Action Dated Jan. 18, 2016, Application No. 201410431598.X, Applicant Airbus Helicopters Deutschland Gmbh, 5 Pages.
Chinese Search Report Dated Dec. 16, 2015, Application No. 201410431598.X, Applicant Airbus Deutschland Gmbh, 1 Page.
Extended European Search Report Dated Feb. 24, 2014, Application No. 13400018.1-1754, Applicant Eurocopter Deutschland GmbH, 7 Pages.

* cited by examiner

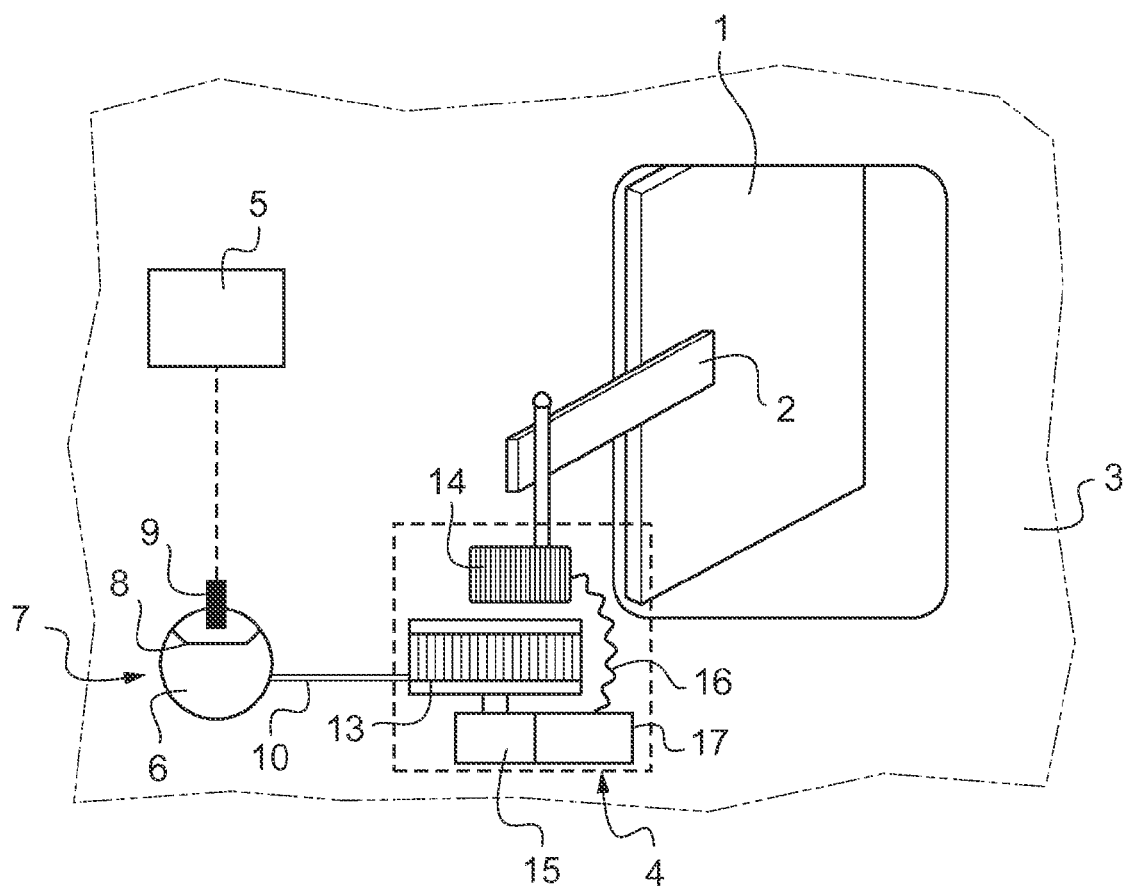

SHORT TERM, AUTONOMOUS, ELECTRICAL POWER SUPPLY SYSTEM

CROSS REFERENCE TO RELATED APPLICATION

This application claims priority to European patent application No. EP 13 400018.1 filed on Aug. 30, 2013, the disclosure of which is incorporated in its entirety by reference herein.

BACKGROUND OF THE INVENTION (1) Field of the Invention

The invention relates to a short term, autonomous, electrical power supply system, particularly to a short term, autonomous, electrical power supply system for opening automatically a passenger door of an aircraft in case of emergency with the features of claim 1.

(2) Description of Related Art

For reasons of safety, passenger doors and also emergency exit doors of an aircraft must be able to be opened with very high reliability and rapidly in the event of an emergency landing, for example, so that passengers may rapidly leave the aircraft.

The document EP 2305560 A discloses a device for opening a passenger door of an aircraft in case of emergency. Said passenger door is manually pivotable on the fuselage of the aircraft via a hinge and/or support arm configuration.

An auxiliary-energy operated emergency opening drive is provided between the fuselage and the passenger door, which automatically opens the passenger door in accordance with an emergency control unit. The auxiliary energy for the emergency opening drive is pyrotechnic energy, with gas expanding inside an expansion chamber after triggering by an emergency control unit to open the passenger door. The emergency opening drive comprises a turbine for generating a rotational movement from the pyrotechnic energy. The turbine works together with a downstream reduction gear to open the passenger door. The transformation of the energy created in extremely short time (milliseconds), to an application running for a few seconds results in a certain effort in terms of weight, cost, and space.

The document EP1418121 discloses an emergency door opening apparatus for use on an aerospace vehicle. The apparatus includes a fluid cylinder and a piston operatively connected to the door and to the vehicle and a supply of gas generating chemicals which, when ignited, are operable to rapidly generate and supply to the fluid cylinder a sufficient amount of gas to move the fluid cylinder and piston to effect opening of the door. This apparatus results in uncontrolled violent pivoting of the passenger door.

Electrical actuated aircraft doors need large, expensive and unreliable accumulation. A current system with an electrical emergency power storage adds extra weight of about 8 kg per passenger door.

BRIEF SUMMARY OF THE INVENTION

It is an object of the invention to provide for a short term, autonomous, electrical power supply system, particularly an emergency short term, autonomous, electrical power supply system for opening a passenger door.

The solution is provided with a short term, autonomous, electrical power supply system, particularly an emergency short term, autonomous, electrical power supply system with the features of claim 1 of the invention. Preferred embodiments of the invention are provided with the respective subject matters of the subclaims.

According to the invention a short term, autonomous, electrical power supply system, particularly an emergency short term, autonomous, electrical power supply system, comprises an actuator, an electrical generator for driving said actuator and a turbine in mechanical driving engagement with said electrical generator.

A generator of gaseous fluids from combustible, fluidic energy or from gas generating chemicals like propellants, also referred to as "gas generator", is connected with a fluid line from said generator to said turbine. A control unit activates an igniter arranged inside said gas generator to expand said combustible, fluidic energy by combustion with an expansion from said gas generator through said fluid line to said turbine. Said fluidic energy expanding as gaseous fluids from said gas generator through said fluid line impinges on said turbine to rotate said turbine and subsequently the electrical generator the turbine is mechanically mounted on.

The electrical rotary generator supplies electrical energy to an electrical motor of the actuator, e.g. to open a passenger door of an aircraft in an emergency. The electrical rotary generator of the inventive short term, autonomous, electrical power supply system is based on electromechanical induction driven by energy in gaseous fluids The gaseous fluids contain energy sufficient to effect the opening of the door after transformation into electrical power. The gas generating chemicals like propellants are ignited for supply of the fluidic energy i.e. the gaseous fluids.

The invention allows the generation of electrical energy on demand especially in emergency cases, where provision of electrical energy on demand is more effective than consuming stored electrical energy. The invention allows avoidance of expensive and heavy long term storage of electrical energy. The inventive short term, autonomous, electrical power supply system requires only little space as there is no need for any long or short term energy storages. Due to the absence of such energy storage devices makes the inventive short term, autonomous, electrical power supply system maintenance-free.

Depending on the physical form of the turbine the transformation of the energy is pure kinetic or thermal or a combination of them. The inventive short term, autonomous, electrical power supply system provides electrical energy on short term demand—without extra devices to store the electrical energy—during the complete consumption phase with the turbine due to its kinetic energy serving as a buffer to extend the energetic provision phase.

Thus the inventive short term, autonomous, electrical power supply system allows:

a) transformation of energy in gaseous fluids into electrical energy by a turbine driven electrical generator, i.e. no sealing issues; no risk of heat damages; savings in terms of cost, weight and space;

b) provision of electrical device directly, i.e. deletion of batteries;

c) an automatic opening of the passenger door in accordance with an emergency control unit;

d) deletion of any gears since the electrical generator of the inventive system is able to work in a wide range of turning speeds;

e) widening of the range of applications since the electrical output energy can be used and adapted in many ways, and f) quick transfer of energy to the turbine for use by the electrical generator with less effort and reliable technology.

According to a preferred embodiment of the invention the actuator comprises a support arm for opening of a door, preferably for opening of an emergency exit and more preferably for opening of an emergency exit of an aircraft.

According to a further preferred embodiment of the invention the turbine is integrated in the electrical generator or mounted directly coaxial on the electrical generator by means of a turbine adaptor or extension. The turbine is suitable to transform kinetic or thermal energy of the used fluid.

According to a further preferred embodiment of the invention the combustible, fluidic energy is gaseous generated by a chemical process i.e. the ignition of propellants.

According to a further preferred embodiment of the invention the gas generator is a plug type gas generator cartridge, e.g. containing gas generating chemicals, i.e. a propellant for reduced maintenance, simple replacement and high reliability.

According to a further preferred embodiment of the invention, the gas generating chemicals are stored in a separate chamber located in the expansion chamber.

According to a further preferred embodiment of the invention the fluid line from said gas generator to said turbine comprises control means, said control means may be a venturi.

According to a further preferred embodiment of the invention the igniter is electro-explosive electrically actuated by the emergency control unit.

According to a further preferred embodiment of the invention an electrical connection is provided and in that the electrical motor of the actuator is supplied from the electrical generator by means of the electrical connection to allow arrangement of said electrical motor locally separated from the electrical generator.

According to a further preferred embodiment of the invention an electrical buffer is provided and in that the electrical motor of the actuator is supplied from the electrical generator via the electrical buffer by means of the electrical connection. The gas generator or reservoir can be separated from the buffer or actuator or any other element of the inventive system.

According to a further preferred embodiment of the invention the emergency actuator allows manual door operation and thus allows deletion of a coupling between the emergency actuator and an aircraft door for further simplification of the inventive system. Emergency actuation systems must be designed in a way to allow manual operation and closing of the once opened aircraft door in any condition, and to prevent damages caused by actuation once the end position of the aircraft door is reached.

A pyrotechnical powered actuator for an aircraft door as disclosed in EP 2305560 A needs couplings or pressure release devices to guarantee the manual operation and reclosing due to a reduction gear with a self-inhibiting high gear ratio. Further the coupling is needed to prevent the actuator from trespassing stop at the end position in case of a power overrun. With the actuator of the invention no coupling is needed for release of the aircraft door from the emergency actuator, since manually opening and reclosing of the aircraft door is possible. According to the invention any power overrun can preferably be compensated by using a simple end position switch.

The invention can be used for any vehicle with electrical systems taking benefit from an independent energy source, namely passenger doors, doors and hatches of an aircraft for opening in case of emergency.

BRIEF DESCRIPTION OF THE SEVERAL VIEWS OF THE DRAWINGS

A preferred embodiment of the invention is presented by means of the description with reference to the attached drawing.

FIG. 1 shows a schematic view of a short term, autonomous, electrical power supply system according to the invention.

DETAILED DESCRIPTION OF THE INVENTION

According to FIG. 1 a short term, autonomous, electrical power supply system is provided for emergency actuation of a passenger door 1 of an aircraft. The passenger door 1 is fastened to a fuselage 3 of the aircraft via a pivotable support arm 2. The support arm 2 carries the entire load of the passenger door 1 via hinge means, so that the passenger door 1 may be opened and closed manually. Seal and closing means (not shown) are provided between the fuselage 3 and the passenger door 1, to keep the passenger door 1 closed securely and pressure-tight during flight.

The short term, autonomous, electrical power supply system is provided with an emergency actuator 4 inside the fuselage 3 at the passenger door 1. The emergency actuator 4 comprises an electrical generator 15 driven by a coaxially mounted turbine 13. The turbine 13 is connected by means of a fluid line 10 to a gas generator 7 with an expansion chamber 6 inside. Combustible gaseous fluids and gas generating chemicals like propellant are stored in the expansion chamber 6. An electro-explosive igniter 9, i.e. a piezo-electric igniter, is mounted on the gas generator 7 for ignition of the gas generating chemicals in the expansion chamber 6. The gas produced from the ignited gas generating chemicals expands into the expansion chamber resulting in the required pressure for expansion to drive the turbine 13.

The igniter 9 is controlled by an emergency control unit 5. The igniter 9 is inserted replaceable in the wall of the expansion chamber 6. If the gas generating chemicals are stored in the separated chamber 8 located in the expansion chamber 6, the igniter 9 is inserted replaceable in the wall of this separated chamber 8.

The electrical generator 15 and the electrical motor 14 are in one housing (not shown) or separated due to space constraints. If the electrical generator 15 and the electrical motor 14 are separated an electrical connection 16, e. g. a cable, is provided between the electrical generator 15 and the electrical motor 14.

A buffer 17 for electrical energy produced by the generator is provided and a conductive mean 16 from said buffer 17 to the motor 14.

Method of Operating the Short Term, Autonomous, Electrical Power Supply System In case of emergency the electro-explosive igniter 9 is electrically actuated by the emergency control unit 5. The ignition of the explosive gaseous fluids inside the expansion chamber 6 is performed via the electro-explosive igniter 9 supplied with power from an onboard electrical network (not shown).

The fluid line 10 from said generator 7 to said turbine 13 equipped with control means (not shown), e.g. a venturi, is interposed between the expansion chamber 6 and the turbine 13, to control the pulsed pyrotechnic energy generated in the expansion chamber 6 for a more easily controllable pressure impingement of the turbine 13. The pressure impingement from the gaseous fluids rotates the turbine 13. The electrical generator 15 is rotatable driven by the turbine 13 for transformation of the pyrotechnic energy into electrical energy.

The electrical energy produced by the electrical generator 15 is then supplied from the electrical generator 15 via the electrical connection 16 to the electrical motor 14 or the electrical energy is first stored in the buffer 17 and then delivered via the electrical connection 16 to the electric motor 14 of the actuator to activate the hinged support arm 2 for opening of the passenger door 1.

REFERENCE LIST

1. Passenger Door
2. Support arm
3. Fuselage
4. Emergency Actuator
5. Emergency Control unit
6. Expansion Chamber
7. Gas-Generator
8. Separate Chamber
9. Igniter
10. Fluid line
13. Turbine
14. Electrical Motor
15. Electrical Generator
16. Electrical Connection
17. Buffer

What is claimed is:

1. An emergency short term, autonomous, electrical power supply system, the system comprising:
   an emergency actuator with an electrical motor;
   an electrical generator for driving the electrical motor of the emergency actuator;
   a turbine in driving engagement with the electrical generator;
   a gas generator of combustible, fluidic energy and/or gas generating chemicals;
   a fluid line from the gas generator to the turbine;
   an emergency control unit; and
   an igniter arranged inside the gas generator and controlled by the emergency control unit;
   wherein the emergency actuator is linked to a door via a support arm.

2. The system according to claim 1, wherein the turbine is integrated in the electrical generator.

3. The system according to claim 1, wherein a turbine adaptor or extension is provided and in that the turbine is mounted directly coaxial on the electrical generator by means of the turbine adaptor or extension.

4. The system according to claim 1, wherein the energy is obtained from fluidic gaseous combustible.

5. The system according to claim 1, wherein the gas generator is a plug type gas generator cartridge.

6. The system according to claim 1, wherein the fluid line from the gas generator to the turbine comprises control means.

7. The system according to claim 1, wherein the igniter is electro-explosive, electrically actuated by the emergency control unit.

8. The system according to claim 1, wherein the igniter is inserted replaceable in a wall of an expansion chamber.

9. The system according to claim 1, wherein the igniter is inserted replaceable in a wall of a separate chamber containing gas generating chemicals, the separate chamber being located in an expansion chamber.

10. The system according to claim 1, wherein an electrical connection is provided and in that the electrical motor of the actuator is supplied from the electrical generator via the electrical connection.

11. The system according to claim 8, wherein an electrical buffer is provided and in that the electrical motor of the actuator is supplied from the electrical generator via the electrical buffer by means of an electrical connection.

12. The system according to claim 1, wherein the electrical motor and the electrical generator are in one housing.

13. The system according to claim 1, wherein in that the emergency actuator allows manual door operation.

14. The system according to claim 1, wherein an end position switch is provided for the emergency actuator.

15. The system according to claim 1, wherein the emergency actuator is linked to an emergency exit door of an aircraft via a support arm.

16. The system according to claim 1, wherein a turbine adaptor or extension is provided, with the turbine being mounted directly coaxial on the electrical generator via the turbine adaptor or extension.

17. A short term, autonomous, electrical power supply system, the system comprising:
   an actuator with an electrical motor;
   an electrical generator capable of driving the electrical motor of the actuator;
   a turbine in driving engagement with the electrical generator;
   a gas generator;
   a fluid line connecting the gas generator to the turbine;
   a control unit; and
   a gas generator initiator arranged inside the gas generator and controllable by the control unit;
   wherein the actuator is linked to a door via a support arm.

18. The system according to claim 17, wherein the gas generator contains fluid or gas forming materials.

19. The system according to claim 17, wherein the emergency actuator is linked to an emergency exit door of an aircraft via a support arm.

20. The system according to claim 17, wherein the turbine is integrated in the electrical generator.

* * * * *